Dec. 14, 1965   F. E. WILLOUGHBY   3,223,796
INSULATED ELECTRIC FENCE WIRE STRUCTURE
Filed July 23, 1962
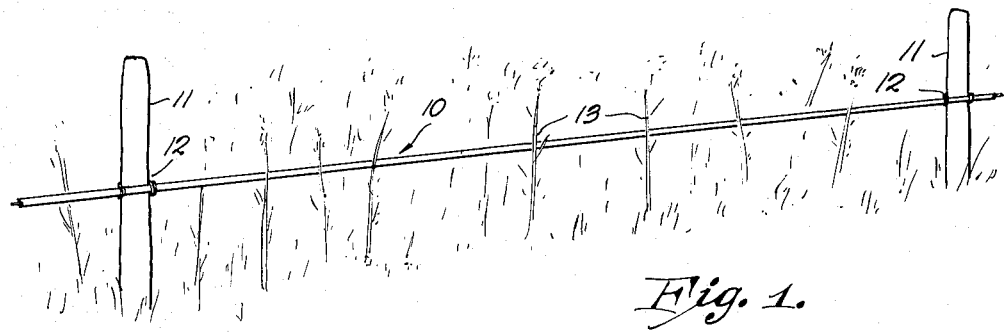
Fig. 1.
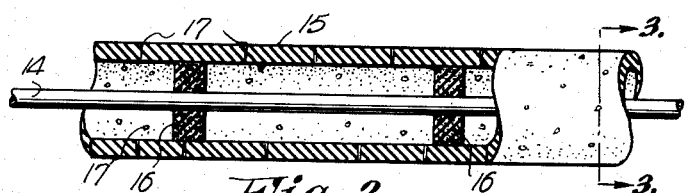 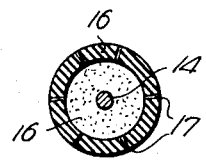
Fig. 2.   Fig. 3.
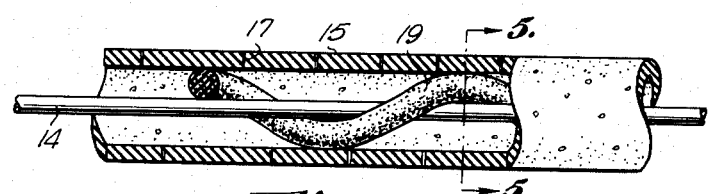 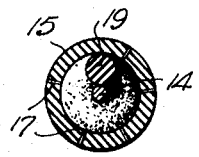
Fig. 4.   Fig. 5.
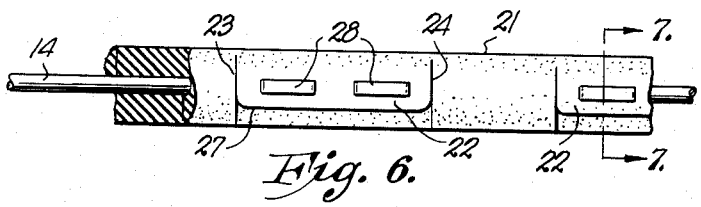 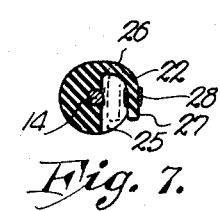
Fig. 6.   Fig. 7.
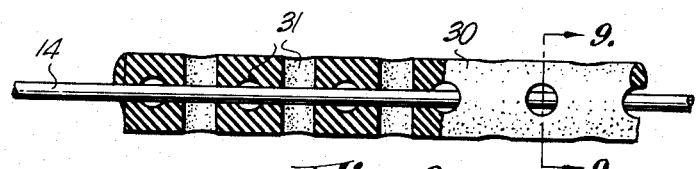 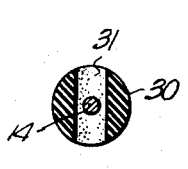
Fig. 8.   Fig. 9.
INVENTOR.
Francis E. Willoughby
BY
Leofield, Kokjer, Leofield & Lowe
ATTORNEYS.

United States Patent Office 3,223,796
Patented Dec. 14, 1965

3,223,796
INSULATED ELECTRIC FENCE WIRE STRUCTURE
Francis E. Willoughby, Potter, Nebr., assignor to Willoughby Manufacturing Company, Potter, Nebr., a corporation of Nebraska
Filed July 23, 1962, Ser. No. 211,548
6 Claims. (Cl. 200—61.41)

This invention relates to a fence wire structure for use in electrically charged fences and refers more particularly to a fence wire structure which is insulated against grounding by weeds, grass or other plant life and similar objects.

The conventional electric fence comprises a charged wire which is supported at the desired height in much the same fashion as the usual fence wire. Being a bare or exposed wire, it is occasionally grounded by weeds, grass or plants adjacent the fence which close a circuit from the wire to ground. The grounding of the wire is undesirable for a number of reasons, including power loss, electrical interference and the like.

The present invention has for one of its main objects the provision of an insulated fence wire structure which is so constructed as to inhibit accidental grounding by weeds, grass, or other plants and objects, while still preserving the effectiveness of the fence in deterring livestock from contacting or applying pressure thereto.

Another object of the invention is to provide an insulated fence wire which is so constructed that it tends to automatically keep the fences clear of plant life which might otherwise produce substantial grounding.

Other and further objects of the invention together with the features of novelty appurtenant thereto will appear in the course of the following description.

In the accompanying drawings which form a part of the specification and are to be read in conjunction therewith, and in which like reference numerals indicate like parts in the various views;

FIG. 1 is a perspective view of a section of fence showing a wire structure thereon in accordance with the preferred embodiment of the invention;

FIG. 2 is a greatly enlarged fragmentary side elevation of one form of wire structure, parts being shown in longitudinal section for purposes of illustration;

FIG. 3 is a sectional view taken along the line 3—3 of FIG. 2 in the direction of the arrows;

FIG. 4 is a view similar to FIG. 1, but of a modified form of the invention;

FIG. 5 is a cross sectional view taken along the line 5—5 of FIG. 4 in the direction of the arrows;

FIG. 6 is still another view similar to FIG. 2, but showing a further modified form of the invention;

FIG. 7 is a sectional view taken along the line 7—7 of FIG. 6 in the direction of the arrows;

FIG. 8 is still another view similar to FIG. 2, but of a further modified form of the invention, and FIG. 9 is a sectional view taken along the line 9—9 of FIG. 8 in the direction of the arrows.

Referring to the drawings, and initially to FIG. 1, reference numeral 10 designates generally a length of electrically charged insulated fence wire according to the invention. The wire is supported in conventional fashion between fence posts 11, conventional post connectors 12 of any style being used. In order to visually illustrate a feature of the invention later to be touched upon, plant life 13 is shown adjacent the wire, the plant life being of sufficient height to contact the wire under wind forces or the like.

The first form of wire structure 10 is shown in enlarged longitudinal and transverse cross section in FIGS. 2 and 3. The electrical conductor comprises the copper or other highly conductive wire 14 which is of conventional composition and diameter, for example $1/16$ inch. Sleeved over the wire is a cylindrical insulation covering 15 which may be composed of rubber or other flexible insulating material. The cover has an inside diameter of approximately $5/16$ inch to $7/16$ inch so that it is loosely disposed around the wire with the inside surface spaced $1/8$ inch to $3/16$ inch from the wire. To support the cover in this disposition and to provide support therefor at longitudinally spaced intervals (for example, 4 to 6 inches) are the annular spacers 16 which serve to support the portions of the cover bridging therebetween away from the wire. Preferably the spacers are of a resiliently compressible cellular insulation material such as, for example, foam rubber, and of such consistency as to permit displacement of the cover inwardly due to pressure against it by an animal as to bring a substantial length of the bridging portions into contact with the wire.

The cover 15 is interrupted by a pattern of perforations or interruptions into which are placed or embedded highly conductive elements 17 which may be copper or aluminum plugs. These extend completely through the thickness of the cover and are spaced therearound, both circumferentially and longitudinally. The opposite ends of element 17 must be exposed, the inside one to permit contact thereof with the wire and the outside one to provide a conductive surface on the exterior of the cover.

In the operation of the embodiment of FIGS. 2 and 3, the cover is normally spaced from the wire with the elements 17 out of contact with the wire 14. Weeds, plant stalks, grass and other light weight objects which may contact the cover structure will thus be electrically insulated from the wire 14, the spacers being resistant enough to prevent contact of elements 17 with the wire, and no grounding will take place. However, should an animal contact the cover, the weight and force is sufficient to displace the cover against the wire, thus establishing contact with the wire of the elements 17 located in the zone of applied pressure, providing a circuit to the animal.

It will be evident that instead of resilient spacers, the spacers can be made of substantially rigid material, permitting the same end result.

A modified embodiment of the invention illustrated in FIGS. 4 and 5 is constructed like that of FIGS. 2 and 3, except that the spacer here comprises a strand 19 of resiliently compressible cellular material wrapped spirally about the wire with the cover 15 sleeved thereover. The spaces between successive turns of the strand provide the flexing zones necessary to permit contacting of the element 17 with the wire 14.

In FIGS. 6 and 7 the wire 14 is covered with a substantially solid insulation coating 21 of rubber or other elastomeric material. This material is cut to form a series of longitudinally spaced flaps 22, the opposite ends of each flap being identified as 23, 24. As shown in FIG. 7, each flap overlies a cavity 25 in the insulation body, the cavity being sufficiently deep in a radial direction to expose the side face of the wire. The flap is connected with the main body with a hinged portion 26 and is free at its lower edge 27. Conductive brads or inserts 28 extend through interruptions in and are secured to the flap to provide an electrical path therethrough.

In the normal position of the flaps 22 (shown in solid lines in FIG. 7) the conductive elements 28 are spaced from and out of contact with the wire. This spacing is for conventional voltages $1/8$ to $3/16$ inch. However, under pressure against the flap, the flap is displaced inwardly to the broken line position, thus bringing the conductive elements into contact with the wire and establishing a circuit through the insulation media to the hide of the animal.

Care should be taken to see that the hinge area 26 is of sufficient stiffness as to resist ordinary pressures which might result from plant life under the influence of wind.

While the flaps 22 are shown on only one side in FIGS. 6 and 7, it will be apparent that they can be placed on both sides when it is expected that livestock may be ranging on either side of the fence. Where a single line of flaps is used, as is shown in the illustrated embodiment, they will be faced toward the pen side of the fence.

FIGS. 8 and 9 show a further embodiment of the invention. Here the wire 14 is covered with an insulating media 30 having a thickness of from 1/8 inch to 3/16 inch, and provided with a pattern of interruptions in the form of spaced perforations 31. The perforations preferably are about 1/16 inch to 1/8 inch in diameter and provide openings through the insulation to the surface of the wire 14. The material of which the cover 30 is composed can be any good insulating media, for example, cellular or solid rubber, synthetic plastics, such as polyethylene, and like materials.

In this embodiment perforations are sufficiently small as to avoid direct contact with the weeds, plant stalks or the like, and thus, grounding is still avoided. In the event that the stalk or weed is wet or green and provides a grounding path, if it overlies one of the openings a spark will be caused. I have found that this spark is sufficient to sever the weed or stalks, and thus, the fence is kept clear of potentially grounding material.

The sparking effect likewise often takes place in the event that animals contact the fence. This in many cases improves measurably the deterrent effect on livestock.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A fence adapted to be electrically charged to impart a spark to an animal which comes into contact therewith comprising an elongate conductor wire formed of electrically conductive material, an electrically insulative covering material substantially surrounding and enclosing said wire for inhibiting accidental grounding of said wire by weeds, grass and other objects, and means supporting said wire and covering a suitable distance above the ground surface to form the fence, said covering being provided at intervals along its length with interruptions therein disposed to provide a path for electrical discharge from the wire to an animal.

2. The combination as in claim 1 wherein the interruptions in said covering provide perforations through said covering.

3. The combination as in claim 1 including elements of electrically conductive material in said interruptions, the covering so formed and constructed as to normally dispose the elements out of contact with the wire, but permitting contact therewith in response to lateral pressure on the covering.

4. In an insulated electric fence wire structure, the combination of an elongate electrically conductive wire, an insulating cover surrounding and enclosing the wire along the length thereof with portions of the inner surface of the cover spaced from the wire but capable of being displaced toward the wire, and electrically conductive elements extending through said cover and having inner ends at said portions whereby to be contacted with the wire upon said displacement, said cover being supported on spacers between which are located said portions.

5. The combination as in claim 4 wherein said spacers are composed of resiliently compressible material.

6. In an insulated electric fence wire structure, the combination of an elongate electrically conductive wire, an insulative covering supported on said wire and provided at intervals with resiliently hinged flaps having inner surfaces confronting but spaced from said wire, and electrically conductive elements embedded in said flaps and operable to contact the wire in response to displacement of said flaps toward said wire.

References Cited by the Examiner

UNITED STATES PATENTS

| | | | |
|---|---|---|---|
| 504,397 | 9/1893 | Marsh | 174—28 |
| 774,436 | 11/1904 | Johnson | 200—86 |
| 1,602,103 | 10/1926 | DeMoulin | 256—10 |
| 2,128,058 | 8/1938 | Shaw | 200—86 |
| 2,564,081 | 8/1951 | Schilling | 256—10 X |
| 2,613,287 | 10/1952 | Geiger | 200—1 |
| 2,783,442 | 2/1957 | Burnosky | 339—97 |

FOREIGN PATENTS

| | | |
|---|---|---|
| 235,072 | 6/1925 | Great Britain. |
| 112,291 | 10/1925 | Switzerland. |

BERNARD A. GILHEANY, *Primary Examiner.*